US012684657B2

(12) United States Patent
Legrand et al.

(10) Patent No.: US 12,684,657 B2
(45) Date of Patent: Jul. 14, 2026

(54) FLEXIBLE HEATING MAT FOR PREFORMING OR CONSOLIDATING COMPOSITE PARTS

(71) Applicant: ECOLE NATIONALE SUPERIEURE D'ARTS ET METIERS, Paris (FR)

(72) Inventors: Marc Legrand, Saint Amand les Eaux (FR); Olivier Duthoit, Fâches-Thumesnil (FR); Martin Gautherot, Buxières sur Arce (FR); Bernard Paluch, Noeux les Mines (FR)

(73) Assignee: ECOLE NATIONALE SUPERIEURE D'ARTS ET METIERS, Paris (FR)

( * ) Notice: Subject to any disclaimer, the term of this patent is extended or adjusted under 35 U.S.C. 154(b) by 817 days.

(21) Appl. No.: 17/794,741

(22) PCT Filed: Jan. 29, 2021

(86) PCT No.: PCT/FR2021/050173
§ 371 (c)(1),
(2) Date: Jul. 22, 2022

(87) PCT Pub. No.: WO2021/152273
PCT Pub. Date: Aug. 5, 2021

(65) Prior Publication Data
US 2023/0067296 A1     Mar. 2, 2023

(30) Foreign Application Priority Data
Jan. 31, 2020    (FR) ...................................... 2000987

(51) Int. Cl.
   H05B 3/34       (2006.01)
   B29C 33/02      (2006.01)
        (Continued)

(52) U.S. Cl.
   CPC ............... H05B 3/34 (2013.01); B29C 33/02 (2013.01); B29C 35/0266 (2013.01);
        (Continued)

(58) Field of Classification Search
   CPC ........ B29C 35/02; B29C 35/0266; H05B 3/34
   See application file for complete search history.

(56) References Cited

U.S. PATENT DOCUMENTS

| | | | | |
|---|---|---|---|---|
| 3,308,321 A | * | 3/1967 | Provost, Jr. ............ | H01R 39/58 |
| | | | | 310/239 |
| 4,133,711 A | * | 1/1979 | August ................. | B29C 70/545 |
| | | | | 156/367 |

(Continued)

FOREIGN PATENT DOCUMENTS

| | | | | | |
|---|---|---|---|---|---|
| CN | 107512014 B | * | 11/2019 | ............. | B29C 73/10 |
| CN | 110475396 A | * | 11/2019 | ........... | C09D 133/04 |

(Continued)

OTHER PUBLICATIONS

International Search Report from PCT/FR2020/052144 Jan. 13, 2021, 2 pgs.

*Primary Examiner* — Woody A Lee, Jr.
(74) *Attorney, Agent, or Firm* — Tutunjian & Bitetto, P.C.

(57) ABSTRACT

The invention relates to a flexible multilayer heating device, of the heating mat type, for implementing preforming or consolidation of fibrous preforms of composite parts. The device includes at least one first support layer, at least one first heating lead arranged on the at least one first support layer and defining a heat-treatment surface adapted to the surface of the composite part to be preformed or consolidated. A first network of wires is electrically connected to the at least one first heating lead. At least one second heating lead is arranged on the at least one first support layer and defines at least one thermal-blocking belt at the at least one periphery of the heat-treatment surface. A second network of (Continued)

wires is electrically connected to the at least one second heating lead. The invention also relates to plant equipped with a mould and such a heating mat.

18 Claims, 10 Drawing Sheets

(51) Int. Cl.
  *B29C 35/02*        (2006.01)
  *B29C 70/44*        (2006.01)
  *B29L 31/30*        (2006.01)
(52) U.S. Cl.
  CPC ...... *B29C 70/44* (2013.01); *B29C 2035/0211* (2013.01); *B29L 2031/3076* (2013.01); *H05B 2203/003* (2013.01); *H05B 2203/014* (2013.01)

(56) References Cited

U.S. PATENT DOCUMENTS

| | | | | |
|---|---|---|---|---|
| 4,273,604 | A * | 6/1981 | Johnston ................. | B32B 37/00 |
| | | | | 100/211 |
| 6,229,126 | B1 * | 5/2001 | Ulrich ..................... | H05B 6/40 |
| | | | | 219/662 |
| 7,189,944 | B2 * | 3/2007 | Child ..................... | H05B 3/342 |
| | | | | 219/545 |
| 10,213,969 | B2 | 2/2019 | Hopkins et al. | |

| | | | | |
|---|---|---|---|---|
| 10,399,253 | B2 * | 9/2019 | Xie ......................... | B29C 33/02 |
| 10,940,651 | B2 * | 3/2021 | Kestner ................... | H05B 3/34 |
| 11,930,565 | B1 * | 3/2024 | Skinner ................... | H05B 3/34 |
| 12,007,175 | B2 * | 6/2024 | DiChiara, Jr. ...... | F28D 20/0056 |
| 2012/0145702 | A1 * | 6/2012 | Miller .................... | H05B 6/106 |
| | | | | 219/618 |
| 2012/0288583 | A1 * | 11/2012 | Segura Moreno ...... | B29B 11/16 |
| | | | | 425/501 |
| 2014/0317925 | A1 * | 10/2014 | Muschke ................ | B29C 73/34 |
| | | | | 219/494 |
| 2016/0157302 | A1 * | 6/2016 | Matsen ................... | B29C 35/00 |
| | | | | 219/618 |
| 2016/0176100 | A1 * | 6/2016 | Weimer .................. | B29B 11/16 |
| | | | | 425/374 |
| 2018/0080661 | A1 * | 3/2018 | Martire ................. | F24H 15/246 |
| 2018/0319046 | A1 | 11/2018 | Johnson | |
| 2021/0008766 | A1 * | 1/2021 | Kuruppuarachchige ................... | |
| | | | | B64F 5/10 |
| 2023/0067296 | A1 * | 3/2023 | Legrand ................. | B29C 33/02 |

FOREIGN PATENT DOCUMENTS

| | | | | | |
|---|---|---|---|---|---|
| DE | 102012201339 | A1 * | 8/2013 | ............ | F24H 1/185 |
| EP | 1962562 | A1 * | 8/2008 | ............ | B29C 73/04 |
| FR | 2956555 | B1 | 4/2012 | | |
| FR | 3055571 | A1 | 3/2018 | | |
| WO | 2016139359 | A1 | 9/2016 | | |
| WO | 2019075173 | A2 | 4/2019 | | |
| WO | WO-2023281171 | A1 * | 1/2023 | ............ | B29C 33/02 |

* cited by examiner

[Figure 1]
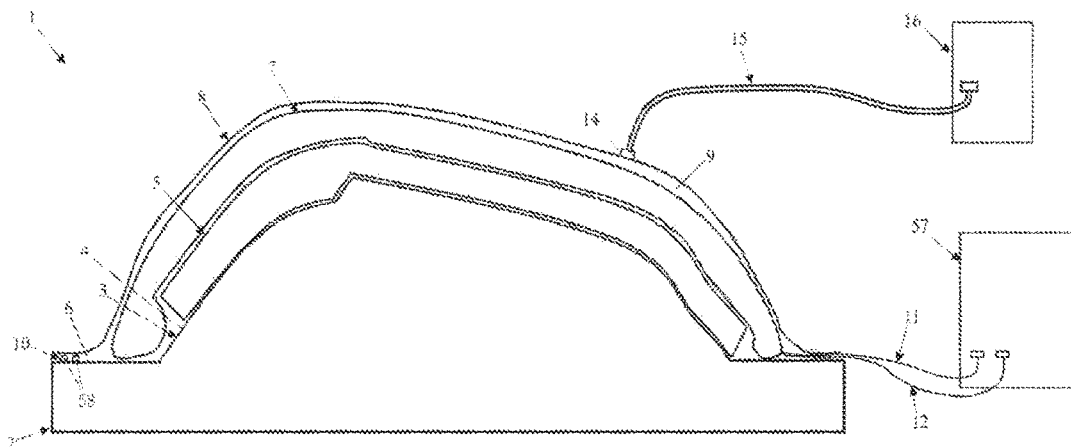
[Figure 2]
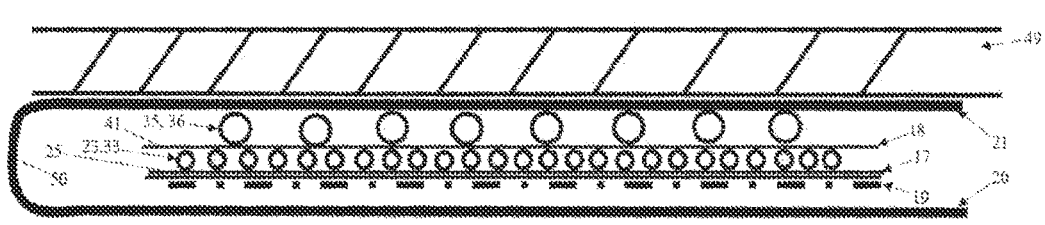
[Figure 3]
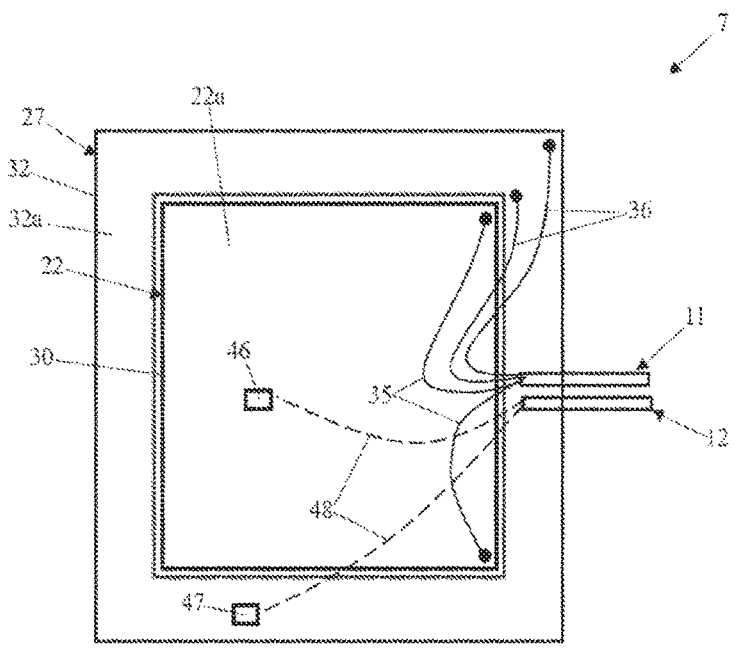

[Figure 4]
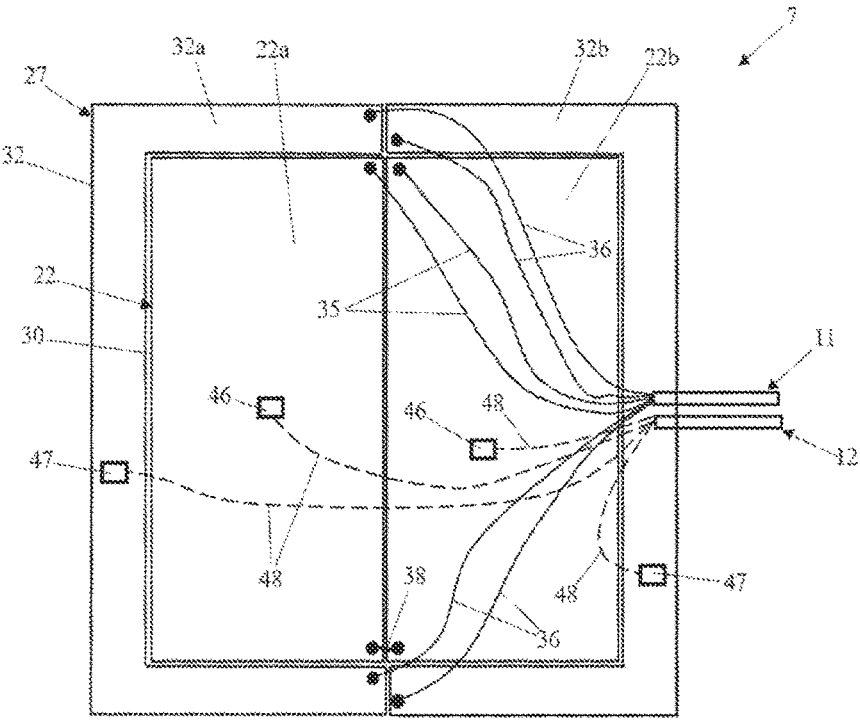
[Figure 5]
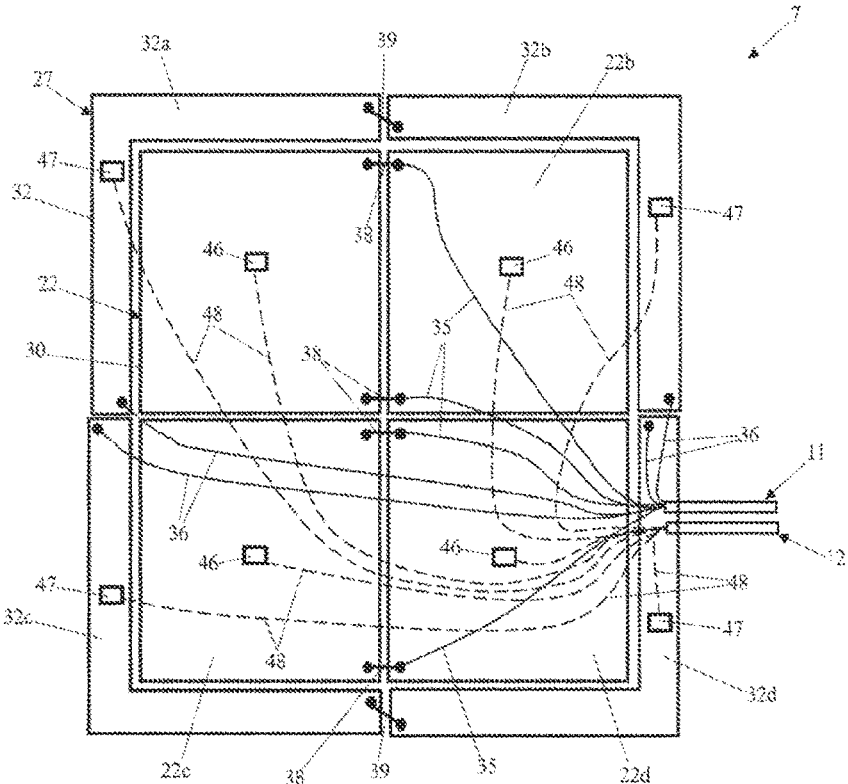

[Figure 6]
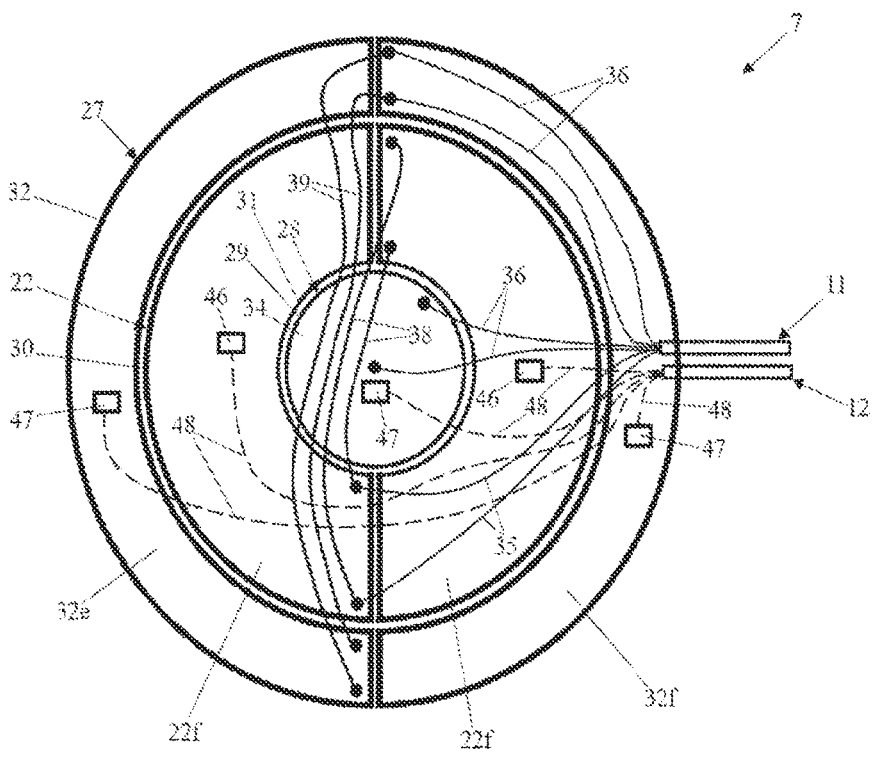
[Figure 7]
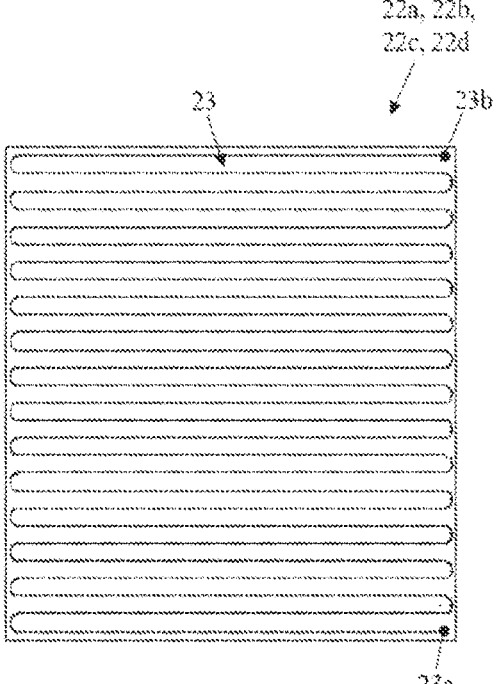

[Figure 8]
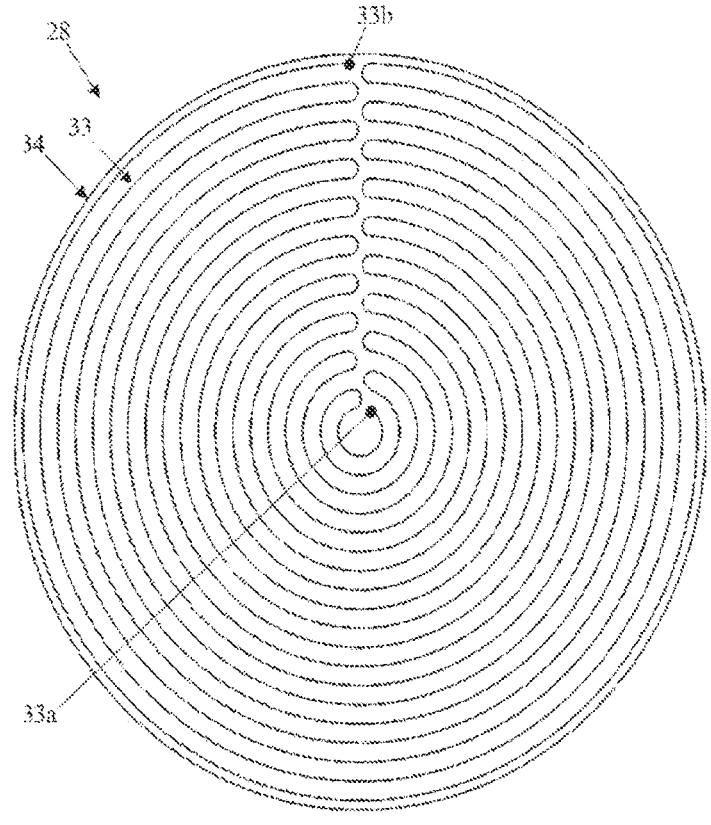
[Figure 9]
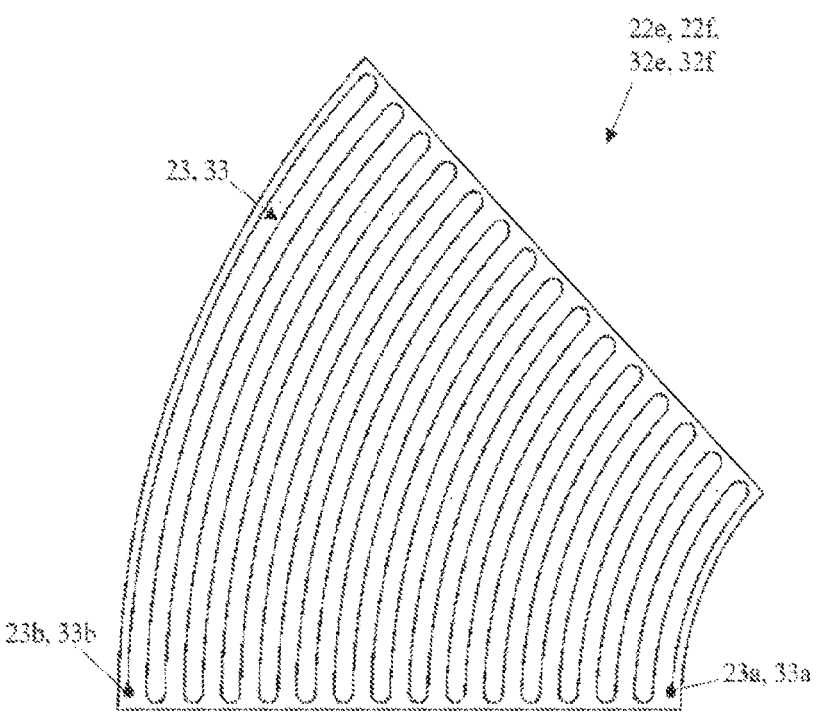

[Figure 10]
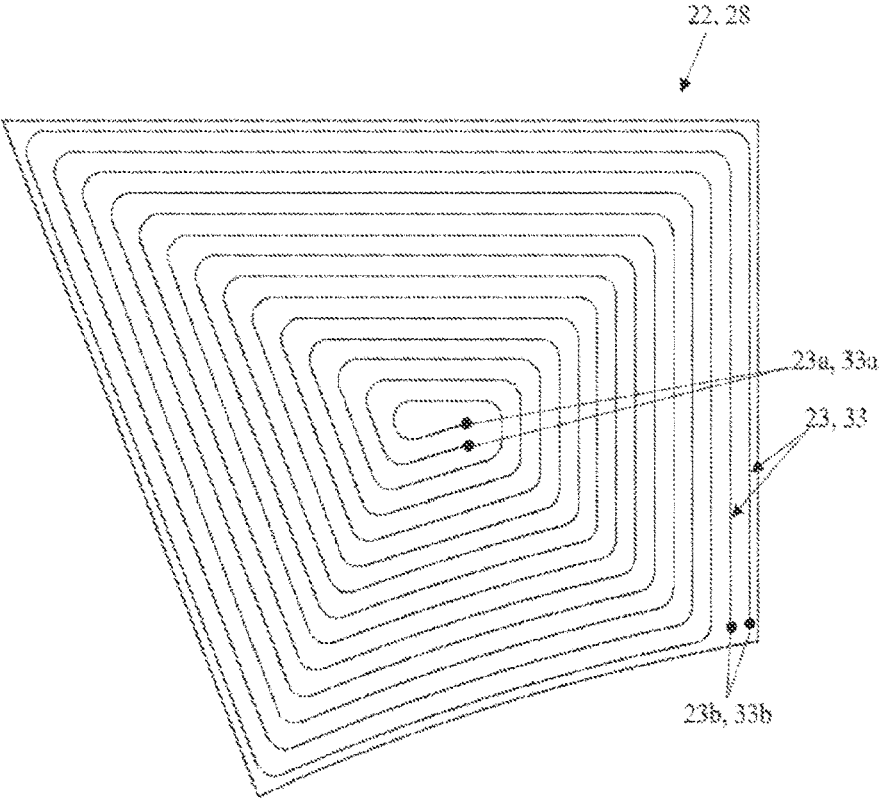
[Figure 11]
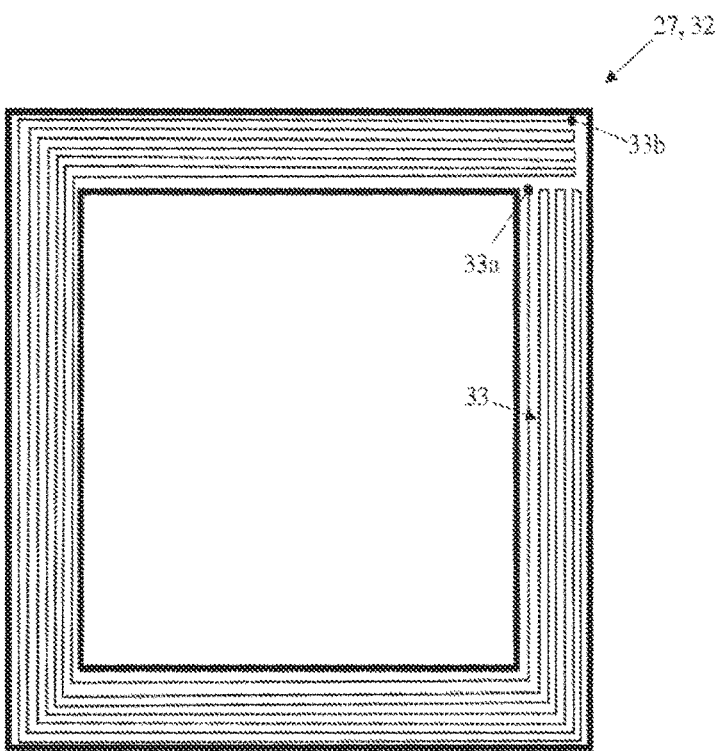

[Figure 12]
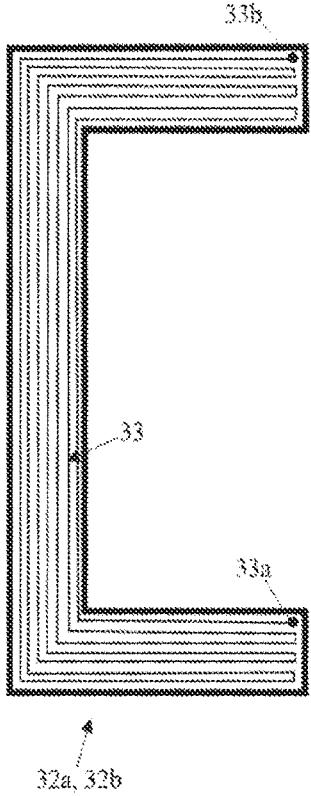
[Figure 13]
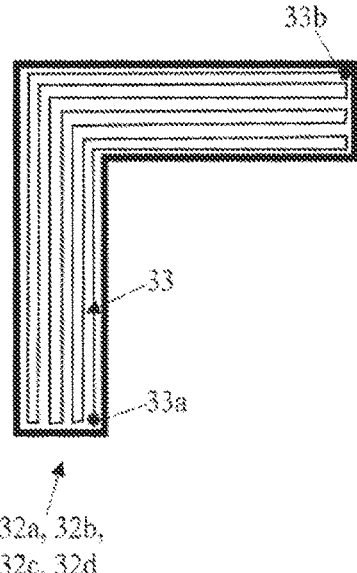

[Figure 14]
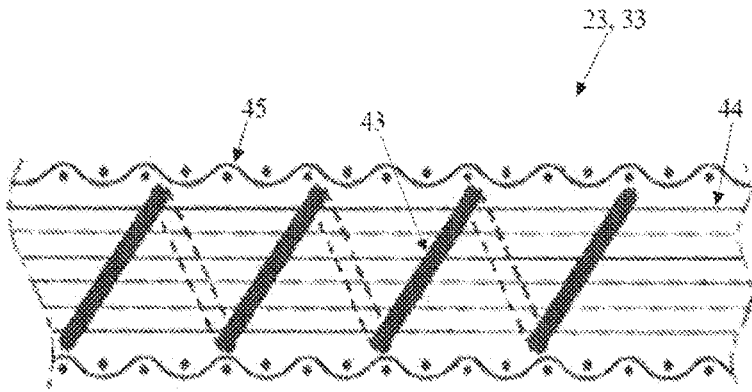
[Figure 15]
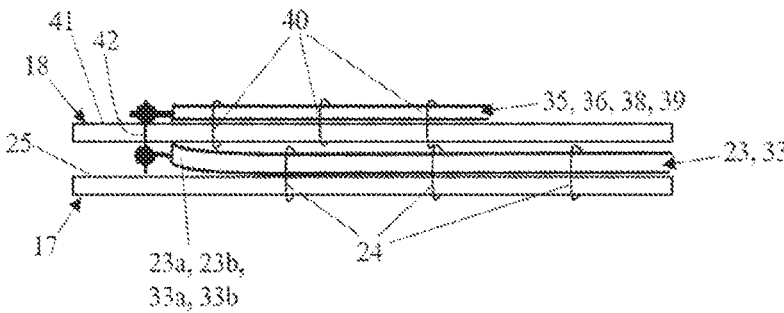
[Figure 16]
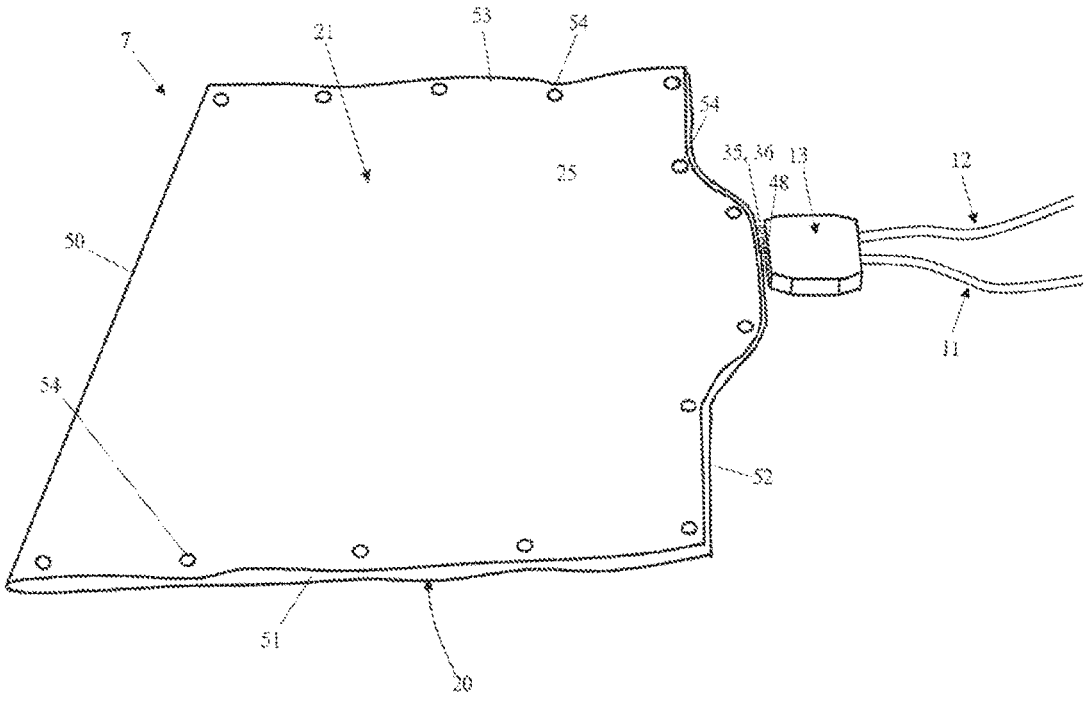

[Figure 17]
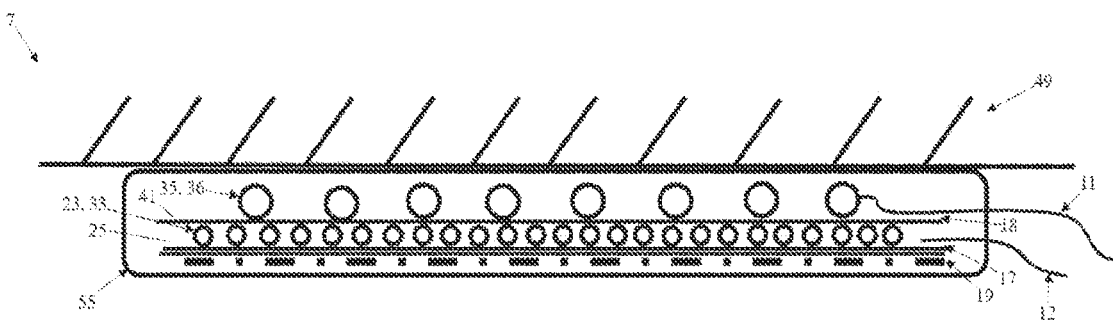
[Figure 18]
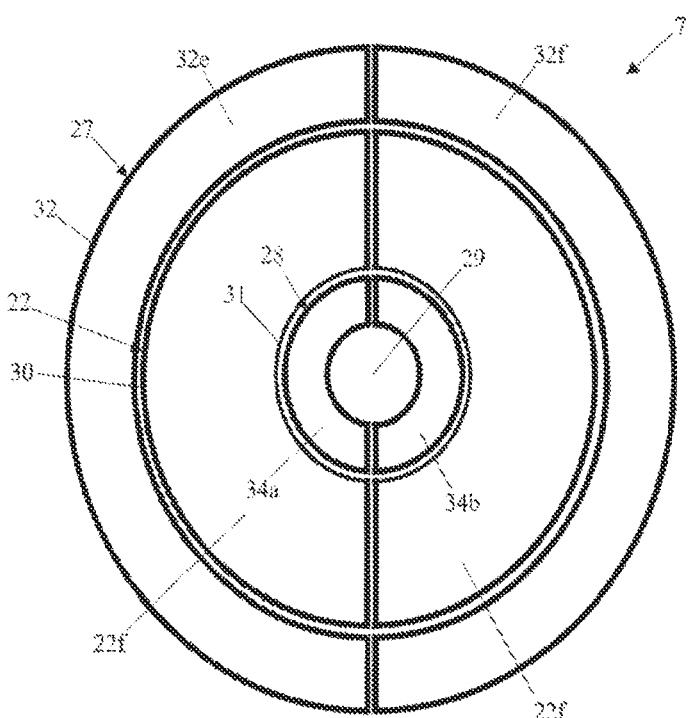

[Figure 19]
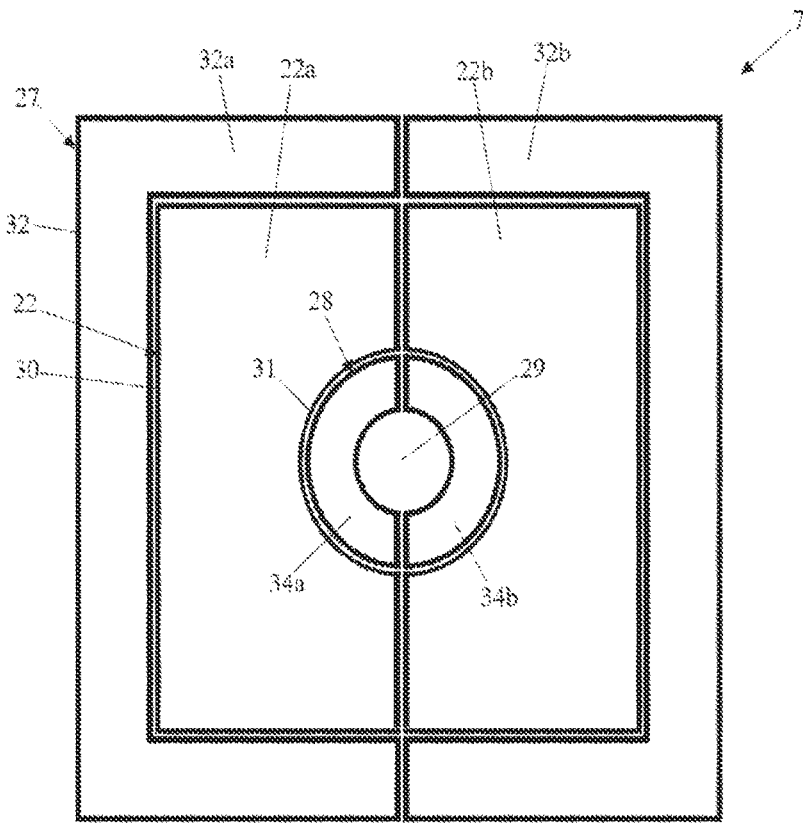
[Figure 20]
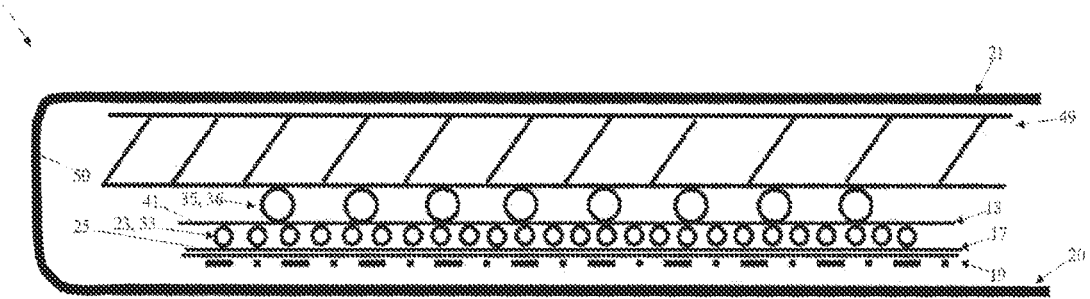

[Figure 21]
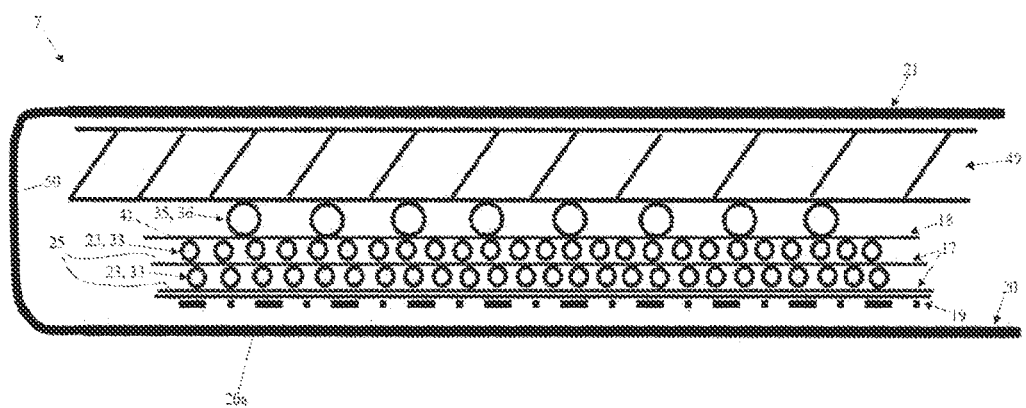
[Figure 22]
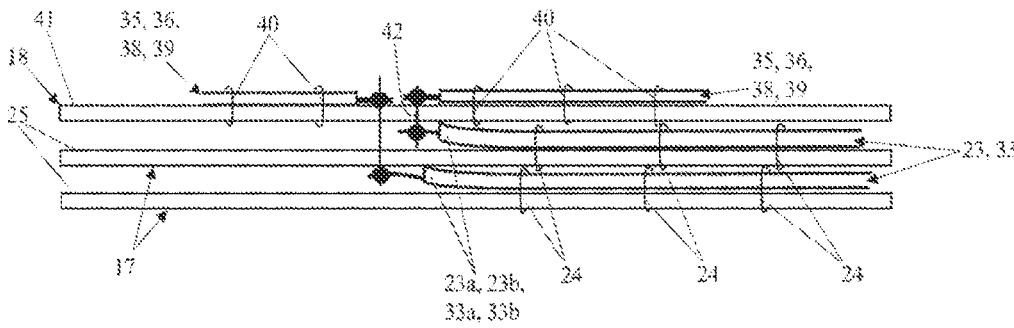

FLEXIBLE HEATING MAT FOR PREFORMING OR CONSOLIDATING COMPOSITE PARTS

TECHNICAL FIELD

The present invention relates to the manufacture of composite parts, in particular those having large surface areas, and relates particularly to a flexible multilayer heating device of the heating mat type used in the field of endogenous-heating moulds for implementing the preforming or consolidation of fibrous preforms of composite parts, for example aeronautical parts.

The invention also relates to a plant for implementing the preforming or consolidation of fibrous preforms of composite parts using such a heating mat.

PRIOR ART

Composite parts with organic matrices are obtained by implementing a certain number of steps by means of a mould, including a pressurisation and heating step serving to transform the resin. The heating of the mould may, according to the technique adopted, be either exogenous or endogenous.

Exogenous heating is obtained in an autoclave or an oven, the heat being transmitted to the mould by convection. This technique consumes a great deal of energy because of the low thermal efficiency of this plant and the great inertia thereof. In addition, this technique is not adapted to producing large parts in mass production. This is because the size of the autoclave limits the dimensions of the manufactured composite parts. Furthermore, the long cooling time necessary limits the production rate of the composite parts.

Endogenous heating consists of integrating heating elements in the mould which, according to a first variant, are heating tubes allowing passage of a heat-transfer fluid that provides calories to the matrix. According to a second variant, metal moulds are equipped with induction heating devices; this technique is very expensive, consumes a great deal of energy and is little suited to large heating surfaces. According to a third variant, metal moulds are equipped with heating resistive cartridges; this technique also consumes a great deal of energy and is little suited to large heating surfaces. These aforementioned three variants are relatively little usable because of the plant constraints, in particular when it is a case of producing large composite parts, and because of the large amount of energy consumed.

A fourth variant consists in using a mould made from composite materials equipped with a resistive heating system, as described in the patent FR 2956555 B1. This fourth variant remains advantageous since the energy consumption is much lower than the previous variants. One drawback of this technique however lies in the fact that the lead composed of a resistive wire disposed in an insulating sheath requires being embedded in a mould that is also made from composite materials, which limits the maximum temperature to the resistance of the resin used in the mould. If it is wished to exceed a temperature of 200° C., it is difficult to keep this technique except using very expensive resins that are difficult to transform (cyanate-ester, polyimide or 350° C. BMI) making it possible to achieve temperatures of 350° C.; if it is wished to exceed a temperature of 350° C., this becomes simply impossible.

A fifth variant consists in using a flexible heating mat applied to a matrix constituting the negative of the composite part to be manufactured. The international patent application WO 2019/075173 A2 and the European patent application EP 3431276 A1 will be cited. These implementations are provided for working at temperatures below 100° C. for WO 2019/075173 A2 and below 200° C. for EP 3431276 A1. Furthermore, a drawback may remain with these implementations, with regard to the obtaining of a homogeneous temperature over the entire surface of the composite part to be manufactured.

European patent EP 2643151 B1 is known, which relates to repairing composite parts or portions of composite parts by using a main heating mat and satellite heating mats disposed adjacent to the periphery of the main heating mat. This makes it possible to compensate for thermal losses at the periphery of the main heating mat and thus to obtain rapid stabilisation of the temperatures throughout the area of the structure covered by the main heating mat. This implementation is difficult to envisage for manufacturing a complete composite part, in particular when it is a case of large composite parts and when the production rates are sustained and require automated placing of the elements.

The European patent application EP 1962562 A1 is also known, which relates to the repair of a composite part of the engine nacelle type and describes a multilayer heating device, of the heating mat type, that has a defined form appropriate to that of the engine nacelle for covering a portion of this engine nacelle. The multilayer heating device comprises a heat-treatment surface adapted to the surface of the engine nacelle, this heat-treatment surface consisting of a plurality of heating zones that each comprise heating elements connected to a network of wires. These heating zones can be managed independently of each other or simultaneously by a controller for locally repairing a defect on the engine nacelle or one or more defects covering several zones or all the zones covering the engine nacelle.

SUMMARY OF THE INVENTION

The present invention relates to a flexible multilayer heating device, of the flexible heating mat type, for preforming or consolidating fibrous preforms of composite parts, in particular large composite parts.

A preforming operation is an operation prior to an operation of consolidating a part with a composite structure. A preform can be produced by stacking layers of unidirectional fibres or of any other textile layers, for example fabrics, multiaxial layers or mats, preferably made from carbon, glass or aramid fibres, these layers being coated with thermoplastic resin on a master model. This preliminary operation is generally implemented by a "draping" robot. The result is said to be "preconsolidated", i.e. it has low mechanical strength and still a great deal of air between the various layers, the connection between layers being made by melting the resins.

In a consolidation operation, the preform previously obtained is placed on a die constituting the negative of the composite part to be manufactured and the heating mat is placed on the preform with protection between the two, the whole is next covered with a membrane for producing a vacuum, with optionally the prior placing of an insulating layer between the heating mat and the membrane. The consolidation operation consists in heating the preform, under a vacuum as perfect as possible, to a temperature that may be around 400° C. The role of the consolidation is to guarantee maximum cohesion of the various layers by melting the thermoplastic resin while evacuating the residual air contained between the layers. The final result is therefore a perfectly welded structure free from any porosity.

The main objective of the invention is to design a flexible heating mat that ensures homogeneous distribution of the temperature at every point on the surface of the composite part, during the implementation of an operation of preforming or consolidating fibrous preforms of the composite parts to be manufactured. The aim of this is to guarantee homogeneous heating over the entire surface of the composite part.

For this purpose, the device according to the invention comprises at least one first support layer, at least one first heating lead arranged, for example in a coil or in a spiral, on at least one first support layer and defining a heat-treatment surface adapted to the surface of the composite part to be preformed or to be consolidated, and a first network of wires electrically connected to the at least one first heating lead. Furthermore, the device comprises at least one second heating lead arranged, for example in a coil or in a spiral, on the at least one first support layer and defining at least one thermal-blocking belt at the at least one periphery of the heat-treatment surface and one second network of wires electrically connected to the at least one second heating lead. Thus the at least one thermal-blocking belt avoids heat losses at the at least one periphery of the heat-treatment surface, which makes it possible to obtain rapid stabilisation of the temperatures over the entire surface of the composite part to be preformed or to be consolidated and covered by said heat-treatment surface. It will be understood that a thermal-blocking belt surrounds a peripheral edge of the heat-treatment surface.

When the surface of the composite part is solid, i.e. without any recess, the heat-treatment surface is also solid and includes only an external periphery, in which case a single thermal-blocking belt is provided. If on the other hand the surface of the composite part comprises one or more recesses, the heat-treatment surface may also include the same number of recesses or remain solid. If this heat-treatment surface includes such recesses, then a thermal-blocking belt will be provided at the external periphery of the heat-treatment surface and thermal-blocking belts will be provided at the internal peripheries defined by said recesses on the heat-treatment surface.

According to one embodiment of the device that is the object of the invention, at least two first heating leads are arranged, for example in a coil or in a spiral, so as to adjoin each other on the at least one first support layer so as to define the heat-treatment surface, and at least two second heating leads are arranged, for example in a coil or in a spiral, so as to adjoin each other on the at least one first support layer so as to define the at least one thermal-blocking belt around said heat-treatment surface. This makes it possible to adapt the heating powers of the heat-treatment surface to obtain a homogeneous temperature whatever the variations in thickness of the composite part to be preformed or to be consolidated and likewise to adapt the heating powers on the blocking belt to ensure homogeneity of temperatures at the periphery of said heat-treatment surface.

Preferably, according to this aforementioned embodiment, for each first heating lead present on the at least one first support layer, one or two second heating leads are disposed so as to match said first heating lead.

According to this aforementioned embodiment of the device that is the object of the invention, the at least two first heating leads are connected together in series and/or in parallel by means of first electrical connection wires, and the at least two second heating leads are connected together in series and/or in parallel by means of second electrical connection wires. In other words, on each first support layer, certain first heating leads can be connected in series and others in parallel, a first group of first heating leads connected in series can be connected in parallel with a second group of first heating leads connected in series, a first group of first heating leads connected in parallel can be connected in series with a second group of first heating leads connected in parallel, or even a first group of first heating leads connected in parallel can be connected in series or in parallel with a second group of first heating leads connected in series. Likewise, with the second heating leads constituting the thermal-blocking belt. In other words, on each first support layer, the leads can be connected in any arrangement involving putting these leads in series and/or in parallel. This makes it possible to have better control of the heating power provided at any point on each first support layer in order to obtain the required temperature or temperatures anywhere on the heat treatment surface and anywhere on the thermal-blocking belts, with a small number of first and second heating leads.

At least one first support layer means the fact that the device that is the object of the invention may comprise a plurality of first superimposed support layers, each first support layer receiving at least one first heating lead and at least one second heating lead, the first heating leads of the first superimposed support layers defining in combination the heat-treatment surface and the second heating leads of the first superimposed support layers defining in combination the at least one thermal-blocking belt. Superimposing the first support layers makes it possible to increase the thermal power per unit surface area compared with the solution using a single first support layer. Conversely, this makes it possible, for the same thermal power per unit surface area, to limit the intensity of the current circulating in the first and second heating leads and consequently to reduce their maximum temperature in transient mode, which makes it possible to slow down the ageing thereof.

Thus, according to one embodiment of the device that is the object of the invention, it comprises two first superimposed support layers, at least one first heating lead and at least one second heating lead being arranged on each first support layer. The first heating leads of the two first support layers are superimposed and define in combination the treatment surface and the second heating leads of the two first support layers are superimposed and define in combination the at least one thermal-blocking belt.

According to a preferential embodiment of the invention, the device comprises a second support layer arranged above the at least one first support layer. Furthermore, the first network of wires and the second network of wires are arranged on the second support layer. This makes it possible to physically separate the first network of wires and the second network of wires with respect to the first heating leads and the second heating leads. It would however be possible to provide, for sufficiently simple mats, a variant without this second support layer.

According to this preferential embodiment of the device that is the object of the invention, the at least one first heating lead and the at least one second heating lead are attached to a top face of the at least one first support layer by means of first attachment means, preferably by stitching. Furthermore, the first network of wires and the second network of wires are attached to a top face of the second support layer by means of second attachment means, preferably by stitching. Thus, a very precise maintenance in position of the heating leads defining the heat-treatment surface and the at least one thermal-blocking belt is guaranteed, and likewise for the first network of wires and the second network of wires that supply said heating leads.

According to this preferential embodiment of the device, the first network of wires comprises first electrical connection wires that pass at least through the second support layer and are connected by soldering to the at least one first heating lead. Likewise, the second network of wires comprises second electrical connection wires that pass at least through the second support layer and are connected, preferentially by soldering, to the at least one second heating lead. Other permanent connection means can be envisaged in substitution for soldering, for example the use of a crimping ring. "Passes at least through the second support layer" means the fact that the first and second electrical connection wires pass through the second support layer and through the first top support layer, in the presence of two superimposed first support layers, as described previously.

According to this preferential embodiment of the device, the at least one first support layer and the second support layer are designed in an electrically insulating fibrous material, preferably made from glass or basalt fibres.

According to this preferential embodiment of the device, the at least one first support layer and the second support layer are designed in a fibrous material resistant to a temperature of at least 450° C., preferably made from glass or basalt fibres.

According to a preferential embodiment of the device, the at least one first heating lead and the at least one second heating lead each comprise an electrically insulating core made from dry fibres, on which a resistive wire is wound, the whole being able to be covered or not with a braided sheath of insulating dry fibres over its entire length, in order to increase the electrical insulation level of the lead.

According to a first embodiment of the device that is the object of the invention, it comprises two reinforcement layers between which, in particular, the at least one first support layer and the at least one thermal-blocking belt, the first network of wires and the second network of wires are sandwiched. Furthermore, an assembly system is implemented between the two reinforcement layers so as to form an envelope one of the edges of which allows the first network of wires and the second network of wires to emerge.

Preferably, according to this first embodiment of the device, the assembly system allows removable attachment between the two reinforcement layers. The aim of this is to allow access to the first and second heating leads and to the first and second networks of wires in order to implement any maintenance operations on these.

Preferably, according to this first embodiment of the device, the two reinforcement layers are formed from an electrically insulating fibrous material, preferably made from glass or basalt fibres.

Preferably, according to this first embodiment of the device, the two reinforcement layers are designed in a fibrous material resistant to a temperature of at least 450° C., preferably made from glass or basalt fibres.

Preferably, according to this first embodiment of the device, a metal grille is arranged between the bottom reinforcement layer and the at least one first support layer, said metal grille being connected to an electric wire intended to be earthed. This makes it possible to drain the electrostatic charges that accumulate on the surface of the composite part, because of the use of reinforcement layers made from electrically insulating material.

Preferably, according to this first embodiment of the device, it comprises a thermally insulating layer arranged above the at least one first support layer implementing the heat-treatment surface and the at least one thermal-blocking belt. According to one embodiment, the insulating layer is positioned just below the bottom face of the top reinforcement layer, which makes it possible to suitably hold the insulating layer inside the envelope formed by the assembly of the two reinforcement layers. It can however be envisaged, in a variant, positioning the insulating layer above the top face of the top reinforcement layer, the insulating layer then being positioned outside, above the envelope formed by the assembly of the two reinforcement layers.

According to a second embodiment of the device that is the object of the invention, it comprises a covering layer, preferably made from silicone material, wherein in particular the at least one first support layer implementing the heat-treatment surface and the at least one thermal-blocking belt, the first network of wires and the second network of wires are embedded, said covering layer allowing the first network of wires and the second network of wires to emerge at one of its edges.

According to the device that is the object of the invention, it comprises at least two sensors for measuring the temperature arranged on the at least one first support layer at the at least one first heating lead and the at least one second heating lead. These measurement sensors make it possible to monitor the temperatures of the first and second heating leads in order to regulate these from a regulation cubicle to which the first and second networks of wires are connected on two separate regulation channels. According to one embodiment, these temperature-measurement sensors are thermocouples, but variants can be envisaged.

According to one embodiment of the device that is the object of the invention, it comprises a malleable sealing block, preferably made from silicone, through which an electrical supply cable incorporating the first network of wires and the second network of wires and a temperature-measurement cable pass. This malleable block participates in the sealing when the composite part and said device are put under vacuum, during the preforming or consolidation of said composite part.

The invention also relates to a plant for preforming or consolidating fibrous preforms of composite parts, which comprises a mould provided with a top face that includes a periphery and a die constituting the negative of the composite part to be produced, a flexible heating multilayer device having one or other or both of the aforementioned features, the heat-treatment surface and the at least one thermal-blocking belt of said device being adapted to the composite part to be produced, a membrane for producing a vacuum comprising a peripheral edge able to come into sealed contact on the periphery of the top face of the mould and a non-return valve, an air-suction device comprising a pipe able to be connected to said non-return valve, and a regulation cubicle to which the first network of wires and the second network of wires are connected, said cubicle being configured for independently regulating the temperature of the at least one first heating lead and of at least one second heating lead on the at least one first support layer.

BRIEF DESCRIPTION OF THE FIGURES

The features and advantages of the invention will emerge from the reading of the following description based on the figures, among which:

FIG. 1 shows schematically an installation for preforming or consolidating fibrous preforms of composite parts, according to the invention;

FIG. 2 shows schematically in cross section the composition of a flexible multilayer heating device for preforming or consolidating fibrous preforms of composite parts, according to the invention, including a first support layer and a second support layer above the first support layer;

FIG. 3 shows schematically a first example of arrangement of a heat-treatment surface and of a thermal-blocking belt;

FIG. 4 shows schematically a second example of arrangement of a heat-treatment surface and of a thermal-blocking belt;

FIG. 5 shows schematically a third example of arrangement of a heat-treatment surface and of a thermal-blocking belt;

FIG. 6 shows schematically a fourth example of arrangement of a heat-treatment surface and of two thermal-blocking belts;

FIG. 7 shows schematically a first example of an arrangement of a heating lead on a heat-treatment surface or on a thermal-blocking belt;

FIG. 8 shows schematically a second example of an arrangement of a heating lead on a heat-treatment surface or on a thermal-blocking belt;

FIG. 9 shows schematically a third example of an arrangement of a heating lead on a heat-treatment surface or on a thermal-blocking belt;

FIG. 10 shows schematically a fourth example of an arrangement of a heating lead on a heat-treatment surface or on a thermal-blocking belt;

FIG. 11 shows schematically a fifth example of an arrangement of a heating lead on a heat-treatment surface or on a thermal-blocking belt;

FIG. 12 shows schematically a sixth example of an arrangement of a heating lead on a heat-treatment surface or on a thermal-blocking belt;

FIG. 13 shows schematically a seventh example of an arrangement of a heating lead on a heat-treatment surface or on a thermal-blocking belt;

FIG. 14 shows schematically an embodiment of a first or second heating lead;

FIG. 15 shows schematically an electrical connection between an end of a first or second heating lead and an end of a wire of a first or second network of wires;

FIG. 16 illustrates an overall view of a flexible heating multilayer device for preforming or consolidating fibrous preforms of composite parts, according to the invention;

FIG. 17 shows schematically in cross section a variant embodiment of the flexible heating multilayer device according to the invention;

FIG. 18 shows schematically a fifth example of arrangement of a heat-treatment surface and of a thermal-blocking belt;

FIG. 19 illustrates a second example of arrangement of a heat-treatment surface and of a thermal-blocking belt on the heating mat including a first support layer and a second support layer above the first support layer;

FIG. 20 illustrates a variant of FIG. 2, with a thermally insulating layer placed differently;

FIG. 21 illustrates a third example of arrangement of a heat-treatment surface and of a thermal-blocking belt on the heating mat including two superimposed first support layers and a second support layer above the two first support layers;

FIG. 22 shows schematically an electrical connection between a first or second heating lead on a first support layer and a wire of a first or second network of wires on the second support layer and an electrical connection between a first or second heating lead on a second support layer and a wire of a first or second network of wires on the second support layer.

DETAILED DESCRIPTION

In the remainder of the description, the term heating mat designates the flexible multilayer heating device for preforming or consolidating fibrous preforms of composite parts, which is the object of the invention.

Furthermore, the same references are used for designating the same features or the equivalents thereof according to the various variant embodiments, unless indicated in the text.

Furthermore, the terms top, bottom, upper or lower that might be used in the description will be used considering the normal position of the heating mat placed on a horizontal surface.

FIG. 1 illustrates a plant 1 that comprises a mould 2. This mould 2 comprises, on its top face 3, a die 4 constituting the negative of a composite part 5 to be preformed or consolidated with a view to manufacture thereof. This top face 3 also comprises a periphery 6 surrounding said die 4. The plant 1 also comprises a heating mat 7 that completely covers the composite part 5, a protective layer (not illustrated on FIG. 1) being interposed between the heating mat 7 and the composite part 5. This heating mat 7 is itself entirely covered by a membrane 8 for producing a vacuum enabling the space 9 containing the die 4, the composite part 5 and the heating mat 7 to be put under vacuum during a consolidation operation, so that said membrane 8 comes to press against the heating mat 7 and the composite part 5 and drives out the residual air contained between the layers of unidirectional carbon fibres coated with thermoplastic resin stacked and preconsolidated.

In order to produce the vacuum, the peripheral edge 10 of the membrane 8 must be in sealed contact with the periphery 6 of the top face 3 of the mould 2. The membrane 8 may consist of a sheet made from plastics material; in this case, a mastic 58 will be disposed between the peripheral edge 10 and the periphery 6, and the electrical supply cable 11 and the temperature-measurement cable 12 connected to the heating mat 7 (detailed later in the description) are embedded in this mastic 58 as it crosses in order to ensure the seal between said peripheral edge 10 and said periphery 6 when the membrane 8 is put under vacuum. This mastic 58 in strip form consists for example of a material of the BUTYL® type. The membrane 8 may, according to a variant, consist of a silicone material with a thick peripheral edge 10, so that said peripheral edge 10 directly provides a seal with the periphery 6 when the membrane 8 is put under vacuum, i.e. without the additional mastic. In this case, the heating mat 7 will include a small silicone block 13 wherein the electrical supply cable 11 and the temperature-measurement cable 12 will pass, as illustrated by FIG. 16, said silicone block 13 being crushed and hugging the peripheral edge 10 when the membrane 8 is put under vacuum in order to ensure this seal with the periphery 6. The membrane 8 comprises a non-return valve 14 connected by means of a pipe 15 to an air-suction device 16. On this FIG. 16, a single electrical supply cable 11 and a single temperature-measurement cable 12 are illustrated, their numbers being however able to be greater according to the heating mat 7 used.

FIGS. 2 to 16 refer to a preferential embodiment of the heating mat 7 used on the aforementioned plant 1. As illustrated on FIG. 2, the heating mat 7 comprises a first support layer 17, a second support layer 18 disposed above the first support layer 17, a metal grille 19 disposed below the first support layer 17, a bottom reinforcement layer 20 and a top reinforcement layer 21. The two support layers 17, 18 and the metal grille 19 are sandwiched between the two reinforcement layers 20, 21, which envelope them. These various layers 17, 18, 20, 21 and the metal grille 19 are flexible, which enables the heating mat 7 to suitably hug the composite part 5. These various layers 17, 18, 20, 21 are produced from a dry fabric providing electrical insulation and having resistance to temperatures of at least 450° C., these preferably being designed from glass or basalt fibres. The metal grille 19 is earthed by connecting it to one of the electrical supply cables 11, which makes it possible to dissipate the electrostatic charges that accumulate on the surface of the composite part 5, because of the use of reinforcement layers 20, 21 made from electrically insulating material.

With regard to FIGS. 3 to 15, the heating mat 7 comprises a heat-treatment surface 22 the forms and dimensions of which depend on and correspond to the surface of the composite part 5 to be manufactured. This heat-treatment surface 22 consists of one or more first heating leads 23 that are arranged in a coil or in a spiral, preferably, and attached by stitching 24 to the top face 25 of the first support layer 17, as illustrated by FIG. 15. The stitches 24 of the first heating lead or leads 23 on the first support layer 17 are produced in accordance with a pattern so that the location of the heating lead or leads 23 on the first support layer 17 is precise and ensures controlled thermal distribution at the functional face 20a of the bottom reinforcement layer 20, corresponding to a given specification for each composite part 5 to be manufactured. The stitches 24 will advantageously by done automatically by means of a numeric-control stitching machine or embroidery machine.

The number and the arrangement of first heating leads 23 will depend on the various thicknesses existing on the composite part 5 and their forms and, consequently, the need to heat said composite part 5 differently according to these thicknesses. For example, on FIG. 1, the composite part 5 has, on the view in cross section, three zones 5a, 5b, 5c with different thickness, which will require breaking down the heat-treatment surface 22 on the heating mat 7 into three portions 7a, 7b, 7c matching said three zones 5a, 5b, 5c.

On FIG. 3, the heat-treatment surface 22 is formed in a single rectangular portion 22a that can consist of a single first heating lead 23 disposed in a coil over the whole of this portion 22a, as shown by FIG. 7. It would be possible to envisage disposing this first heating lead 23 in a spiral over the whole of this portion 22a, or even other arrangements.

On FIG. 4, the heat-treatment surface 22 is rectangular and formed by two rectangular portions 22a, 22b each consisting of a first heating lead 23 disposed in a coil on the corresponding part 22a, 22b, as shown by FIG. 7, these two portions 22a, 22b being able to heat at different temperatures according to the thicknesses of the composite part 5. It could be envisaged disposing these first heating leads 23 in a spiral on these two portions 22a, 22b, or even other arrangements.

On FIG. 5, the heat-treatment surface 22 is rectangular and formed by four rectangular portions 22a, 22b, 22c, 22d each consisting of a first heating lead 23 disposed in a coil on the corresponding portions 22a, 22b, 22c, 22d, as shown by FIG. 7, these four portions 22a, 22b, 22c, 22d being able to heat at different temperatures according to the thicknesses on the composite part 5. It could be envisaged disposing these first heating leads 23 in a spiral on these four portions 22a, 22b, 22c, 22d, or even other arrangements.

On FIG. 6, the heat-treatment surface 22 is a flat ring formed by two arched portions 22e, 22f each consisting of a first heating lead 23 disposed in a coil on the corresponding portion 22e, 22f, as shown by FIG. 9, these two portions 22e, 22f being able to heat at different temperatures according to the thicknesses of the composite part 5. On this FIG. 9, only a portion of an arc is illustrated, but the principle remains identical in increasing the angle of this portion of an arc over a semicircle, as with the two portions 22e, 22f. It could be envisaged disposing these first heating leads 23 in a spiral on these two portions 22e, 22f, or even other arrangements.

Obviously other various and varied forms of portions of the heat-treatment surface 22 could be envisaged on the same principle, according to the form and the thicknesses on the composite part 5, such as for example any polygonal form 26 on which two first heating leads 23 would be arranged in a spiral, as illustrated in FIG. 10, to constitute said heat-treatment surface 22. It could be envisaged disposing these first heating leads 23 in a coil on this polygonal form, or even other arrangements. Naturally, one, two or more than two heating leads 23 could be arranged according to the same principle as in FIG. 10 for implementing said heat-treatment surface 22, or even a thermal-blocking belt as described below. This can also be envisaged with forms other than the one in FIG. 10.

With regard to FIGS. 3 to 15, the heating mat 7 comprises one or more thermal-blocking belts 27, 28 depending on whether the heat-treatment surface 22 is solid, as on FIGS. 3 to 5, or has a recess 29, as on FIG. 6. The thermal-blocking belt 27 avoids thermal losses at the external periphery 30 of the heat-treatment surface 22 and, in the case of FIG. 6, the thermal-blocking belt 28 avoids the thermal losses at the internal periphery 31 of the heat-treatment surface 22, which makes it possible to obtain a rapid stabilisation of the temperatures over the entire surface of the composite part 5 to be preformed or consolidated and covered by said heat-treatment surface 22.

On FIG. 3, the blocking belt 27 is formed by a frame 32 in a single portion 32a disposed at the external periphery 30 of the heat-treatment surface 22, a second heating lead 33 in a coil forming said frame 32, as shown by FIG. 11. It could be envisaged disposing this second heating lead 33 in a spiral on this frame 32, or even other arrangements.

On FIG. 4, the blocking belt 27 is formed by a frame 32 in two portions 32a, 32b in a U shape disposed at the external periphery 30 of the heat-treatment surface 22, each frame portion 32a, 32b being formed by a second heating lead 33 in a coil, as shown by FIG. 12. These two frame portions 32a, 32b correspond respectively to the two portions 22a, 22b of the heat-treatment surface 22, as shown by FIG. 4. It could be envisaged disposing these second heating leads 33 in a spiral on these two portions 32a, 32b of the frame 32, or even other arrangements.

On FIG. 5, the blocking belt 27 is formed by a frame 32 in four portions 32a, 32b, 32c, 32d in the form of a square disposed at the external periphery 30 of the heat-treatment surface 22, each frame portion 32a, 32b, 32c, 32d consisting of a second heating lead 33 in a coil, as shown by FIG. 13. It could be envisaged disposing these second heating leads in a spiral on these four parts 32a, 32b, 32c, 32d of the frame 32, or even other arrangements.

On FIG. 6, a first blocking belt 27 is formed by a circular frame 32 in two portions 32e, 32f in the form of an arc disposed at the circular external periphery 30 of the heat-treatment surface 22, each arched portion 32e, 32f consisting of a second heating lead 33 in a coil, as shown by FIG. 9. On this FIG. 9, only a portion of an arc is illustrated, but the principle remains identical in increasing the angle of this portion of an arc over a half-ring, as with the two portions 32e, 32f. It could be envisaged disposing these second heating leads 33 in a spiral on these two portions 32e, 32f of the circular frame 32, or even other arrangements. Furthermore, on this FIG. 6, a second blocking belt 28 is formed by a disc 34 disposed inside the internal periphery 31 of the heat-treatment surface 22, a second heating lead 33 in a coil for forming said disc 34, as shown by FIG. 8. It could be envisaged disposing this second heating lead 33 in a spiral on this disc 34, or even other arrangements. The polygonal form of FIG. 7 or of FIG. 10, or even any other forms, could be envisaged for implementing a second thermal-blocking belt 28 at the internal periphery 31 of any heat-treatment surface 22. This disc 34 constituting the second blocking belt 28 can also be replaced by two half-rings 34a, 34b, for example, as illustrated by the variant in FIG. 18, which repeats the other features of the variant of FIG. 6. The variant of the heating mat 7 of FIG. 19 repeats the features of the variant in FIG. 4, on which however a recess 29 and a second blocking belt 28 consisting of two half-rings 34a, 34b are also provided.

Thus, it will be understood that FIGS. 7 to 13, 18 and 19 illustrate only a few possible and non-limitative examples of forms that can form part of the composition of a heat-treatment surface 22 or of a thermal-blocking belt 27, 28. The second heating leads 33 will, as with the first heating leads 23, be fixed by stitching 24 to the top face 25 of the first support layer 17, as illustrated by FIG. 15.

With regard to FIGS. 2 to 6 and 15, the heating mat 7 also comprises a first network of wires 35 that supplies the first heating lead or leads 23 on the heat-treatment surface 22. Likewise, the heating mat 7 comprises a second network of wires 36 that supplies the second heating lead or leads 33 on the thermal-blocking belt 27 and on the second thermal-blocking belt 28, in the presence thereof, as in the case of FIG. 6. The first network of wires 35 and the second network of wires 36 are joined within the same electrical supply cable 11.

In the case where a plurality of first heating leads 23 are present on the heat-treatment surface 22, they may be connected in series and/or in parallel by means of first electrical connection wires 38, according to the various temperatures required on said heat-treatment surface 22 and in order to have better control of the heating power and to offer a wider range of temperatures with a smaller number of first heating leads 23. Likewise, in the case where a plurality of second heating leads 33 are present on the thermal-blocking belt or belts 27, 28, they may be connected in series or in parallel by means of second electrical connection wires 39, according to the various temperatures required on said thermal-blocking belts 27, 28 and in order to have better control of the heating power and to offer a wider range of temperatures with a smaller number of second heating leads 33. Implanting a plurality of first heating leads 23 and a plurality of second heating leads 33 on one and the same first support layer 17 has the advantage of better controlling the heating power provided at every point on the first support layer 17 in order to obtain the required temperature or temperatures at every point on the heat-treatment surface 22 and at every point on the thermal-blocking belt or belts 27, 28, with a smaller number of first and second heating leads 23, 33.

By way of illustrative and non-limitative example, on FIG. 4, the two portions 22a, 22b of the heat-treatment surface 22 are connected in series by first electrical connection wires 38. On FIG. 5, the two first portions 22a, 22b of the heat-treatment surface 22 are connected in parallel by first electrical connection wires 38, and likewise for the two second portions 22c, 22d of said heat-treatment surface 22, and the two first frame portions 32a, 32b of the thermal-blocking belt 27 are connected in series by second electrical connection wires 39, and likewise for the two second frame portions 32c, 32d of the thermal-blocking belt 27. On FIG. 6, the two arched parts 22e, 22f of the heat-treatment surface 22 are connected in series by first electrical connection wires 38 and the two arched portions 32e, 32f of the thermal-blocking belt 27 are connected in series by second electrical connection wires 39.

The first network of wires 35, the second network of wires 36, the first electrical connection wires 38 and the second electrical connection wires 39 are attached by stitching 40 to the top face 41 of the second support layer 18 and are connected by soldering with one of the ends 23a, 23b, 33a, 33b of a first heating lead 23 or of a second heating lead 33 by means of electrical connection wires 42 that pass through the second support layer 18 and are soldered with said wires 35, 36, 38 or 39, as illustrated by FIG. 15.

FIG. 14 illustrates a preferential embodiment of the first and second heating leads 23, 33 that each include a resistive wire 43 surrounding an electrically insulating core 44, this core 44 consisting of dry fibres formed as roving. The resistive wire 43 is connected by soldering to the aforementioned electrical connection wire 42. The first or second heating lead 23, 33 may optionally include, in addition, a sheath 45 of dry fibre surrounding said resistive wire 43. The choice of integrating this sheath 45 or not will depend in particular on the electrical conductivity of the support layers 17, 18 and reinforcement layers 20, 21, according to the material used for them. This sheath 45 may result from braiding, plaiting or knitting. The diameter of the cross section of the heating leads 23, 33 is small compared with the thickness of the support layers 17, 18 and of the reinforcement layers 20, 21, so that the deformations of the heating leads 23, 33 under the effect of the variations in temperature are absorbed by said layers 17, 18, 20, 21 and so that the functional face 20a of the bottom reinforcement layer 20 coming into contact with the composite part 5 is preserved from any deformation.

With regard to FIGS. 3 to 6, first thermocouples 46 are arranged on the first support layer 17, on the various portions 22a, 22b, 22c, 22d, 22e, 22f of the heat-treatment surface 22, so as to record the temperatures thereof. Likewise, second thermocouples 47 are arranged on the first support layer 17, on the various portions 32a, 32b, 32c, 32d, 32e, 32f of the thermal-blocking belt 27 and on the second thermal-blocking belt 28 in the case of FIG. 6, so as to record the temperatures thereof. The temperature-measurement cable 12 has electrical connection wires 48 that are attached by stitching to the top face 41 of the second support layer 18 and connected to these thermocouples 46, 47 by electrical connection wires 42 in the same way as the wires 35, 36, 38, 39 are connected to the first and second heating leads 23, 33, as described previously in support of FIG. 15.

The electrical supply cable 11 of the first and second heating leads 23, 33 and the temperature-measurement cable 12 are connected upstream to a regulation cubicle 57 that recovers the measurements of temperatures on the heat-treatment surface 22 and on the thermal-blocking belt or belts 27, 28 to adjust the electrical supplies of the first and second heating leads 23, 33. This allows precise control of the curing of the composite part 5.

With regard to FIG. 2, the heating mat 7 comprises a thermally insulating layer 49, for example consisting of a mineral material of the ceramic type. On FIG. 7, this thermally insulating layer 49 is disposed above the top reinforcement layer 21, but it can be positioned between the second support layer 18 and the top reinforcement layer 21, as illustrated by FIG. 20. This thermally insulating layer 49 advantageously makes it possible to use a sheet made from a less expensive plastics material for forming the membrane 8, since said sheet does not have to withstand temperatures of around 450° C. This is because the presence of this thermally insulating layer 49 makes it possible to reduce the temperature in contact with the membrane, to a temperature below 60° C.

With regard to FIG. 16, the bottom reinforcement layer 20 and the top reinforcement layer 21 are implemented by means of one and the same reinforcement layer folded in two at a common edge 50, the other three edges 51, 52, 53 of the bottom 20 and top 21 reinforcement layers being assembled removably by means of press studs 54. It is possible to replace these press studs 54 with loops/hooks of the Velcro® type or by Eclair® zip fasteners. This advantageously makes it possible to be able to partly separate the two bottom 20 and top 21 reinforcement layers to access the support layers 17, 18 and the metal grille 19, so as to perform any maintenance operations on the first and second leads 23, 33, on the thermocouples 46, 47 or on the soldering on the electrical connection wires 42. On this FIG. 16, the silicone block 13 appears, in which the electrical supply cable 11 and the temperature-measurement cable 12 pass.

Variants of a heating mat 7 can be envisaged in the context of the invention with regard to the implementation of the heat treatment surface 22 and of the thermal-blocking belt or belts 27, 28. By way of example, with regard to FIGS. 21 and 22, the heating mat 7 has features identical to those described previously in support of FIGS. 2 to 16 and 18 to 20, the difference relating to the fact that this heating mat 7 comprises two first support layers 17 that are superimposed and each receive on their top faces 25 one or more first heating leads 23 attached by stitching 24, the first heating lead or leads 23 on these two first support layers 17 being superimposed and forming in combination the heat-treatment surface 22. Likewise, these two first support layers 17 each receive on their top faces 25 one or more second heating leads 33 attached by stitching 24, the second heating lead or leads 33 on these two first support layers 17 being superimposed and forming in combination the external thermal-blocking belt 27 and optionally the second internal thermal-blocking belt 28. As illustrated previously in support of FIG. 15, the first network of wires 35, the second network of wires 36, the first electrical connection wires 38 and the second electrical connection wires 39 are attached by stitching 40 to the top face 41 of the second support layer 18 and are connected by soldering with one of the ends 23a, 23b, 33a, 33b of a first heating lead 23 or of a second heating lead 33 by means of electrical connection wires 42 that pass through the second support layer 18 and are soldered with said wires 35, 36, 38 or 39 to one or other of the two first support layers 17. As illustrated on FIG. 22, when a connection wire 42 connects a first heating lead 23 or a second heating lead 33 to the first bottom support layer 17 with one of said wires 35, 36, 38, 39 to the second support layer 18, said connection wire 42 also passes through the first top support layer 17. Superimposing the two first support layers 17 makes it possible in particular to increase the thermal power per unit surface area compared with the solution using a single first support layer 17. Conversely, this makes it possible, for the same thermal power per unit surface area, to limit the intensity of the current circulating in the first and second heating leads 23, 33 and consequently to reduce their maximum temperature in transient mode, which makes it possible to slow down the ageing thereof. It could optionally be possible to envisage more than two first support layers 17 superimposed on this same principle.

Other variants of a heating mat 7 can also be envisaged in the context of the invention. For example, as illustrated by FIG. 17, it could be envisaged replacing the two reinforcement layers 20, 21 of the embodiments described previously by a covering layer 55, preferably made from silicone material, in which the first support layer or layers 17 are directly embedded, the second support layer 18 and the metal grille 19, the electrical supply cable 11 and the temperature-measurement cable 12 emerging at the edges 56 of said covering layer 55.

The invention claimed is:

1. A flexible multilayer heating device, of the flexible heating mat type, for implementing preforming or consolidation of fibrous preforms of composite parts, the device comprising:

at least one first support layer, at least one first heating lead arranged on the at least one first support layer and defining a heat-treatment surface adapted to a surface of the composite part to be preformed or consolidated, a first network of wires electrically connected to the at least one first heating lead, at least one second heating lead arranged on the at least one first support layer and defining at least one thermal-blocking belt at least one periphery of the heat-treatment surface, a second network of wires electrically connected to the at least one second heating lead, and two reinforcement layers between which, the at least one first support layer implementing the heat-treatment surface and the at least one thermal-blocking belt, the first network of wires and the second network of wires are sandwiched, an assembly system being implemented between the two reinforcement layers so as to form an envelope the edges of which allow the first network of wires and the second network of wires to emerge.

2. The device according to claim 1, wherein the at least first heating lead is a plurality of first heating leads arranged adjacent to each other on the at least one first support layer so as to define the heat-treatment surface, and the at least second heating lead is a plurality of second heating leads arranged adjacent to each other on the at least one first support layer so as to define the at least one thermal-blocking belt around said heat-treatment surface.

3. The device according to claim 2, wherein, for each first heating lead present on the at least one first support layer, one or two second heating leads are disposed so as to match said first heating lead.

4. The device according to claim 2, wherein two first heating leads are connected together in series or in parallel by first electrical connection wires or a minimum of three first heating leads) are connected together in series and/or in parallel by first electrical connection wires, and two second heating leads are connected together in series or in parallel by second electrical connection wires or a minimum of three second heating leads are connected together in series and/or in parallel by second electrical connection wires.

5. The device according to claim 1, wherein:

the at least one first support layer includes two first superimposed support layers, the at least one first heating lead is a minimum of two first heating leads, and the at least one second heating lead is a minimum of two second heating leads, at least one of the minimum of two first heating leads and at least one of the minimum of two second heating leads being arranged on each of the two first superimposed support layers, the at least one first heating lead on the first of the two first superimposed support layers and the at least one first heating lead on the second of the two first superimposed support layers being superimposed and defining in combination the heat-treatment surface and, the at least one second heating leads on the first of the two first superimposed support layers and the at least one second heating lead on the second of the two first superimposed support layers being superimposed and defining in combination the at least one thermal-blocking belt.

6. The device according to claim 1, further comprising a second support layer arranged above the at least one first support layer, the first network of wires and the second network of wires being arranged on the second support layer.

7. The device according to claim 6, wherein the at least one first heating lead and the at least one second heating lead are attached to a top face of the at least one first support layer by means of first attachment means, by stitching, and the first network of wires and the second network of wires are attached to a top face of the second support layer by means of second attachment means, by stitching.

8. The device according to claim 6, wherein the first network of wires comprises first electrical connection wires that pass at least through the second support layer and are connected by a permanent connection to the at least one first heating lead and, the second network of wires comprises second electrical connection wires that pass at least through the second support layer and are connected by a permanent connection to the at least one second heating lead.

9. The device according to claim 6, wherein the at least one first support layer and the second support layer are designed in an electrically insulating fibrous material resistant to a temperature of at least 450° C., made from glass or basalt fibres.

10. The device according to claim 1, wherein the at least one first heating lead and the at least one second heating lead each comprise an electrically insulating core made from dry fibres, on which a resistive wire is wound.

11. The device according to claim 1, wherein the assembly system is arranged to allow a removable attachment between the two reinforcement layers.

12. The device according to claim 1, wherein the two reinforcement layers are formed from an electrically insulating fibrous material resistant to a temperature of at least 450° C., made from glass or basalt fibres.

13. The device according to claim 12, further comprising a metal grille arranged between the bottom reinforcement layer and the at least one first support layer, said metal grille being connected to an electric wire intended to be earthed.

14. The device according to claim 1, further comprising a thermally insulating layer arranged above the at least one first support layer implementing the heat-treatment surface and the at least one thermal-blocking belt.

15. The device according to claim 12, wherein the thermally insulating layer is positioned just below the bottom face of the top reinforcement layer or, conversely, just above the top face of the top reinforcement layer.

16. The device according to claim 1, further comprising at least two temperature-measurement sensors arranged on the at least one first support layer at the at least one first heating lead and the at least one second heating lead.

17. The device according to claim 1, further comprising a malleable sealing block, made from silicone, through which passes an electrical supply cable incorporating the first network of wires and the second network of wires and a temperature measurement cable.

18. A plant for preforming or consolidating fibrous preforms of composite parts, which comprises:
a mould provided with a top face that includes a periphery and a die constituting a negative of the composite part to be produced,
a flexible multilayer heating device having the features of claim 1, the heat-treatment surface and the at least one thermal-blocking belt being adapted to the composite part to be produced,
a membrane for producing a vacuum comprising a peripheral edge able to come into sealed contact on the periphery of the top face of the mould and a non-return valve,
an air-suction device comprising a pipe able to be connected to said non-return valve and a regulation cubicle to which the first network of wires and the second network of wires are connected, said regulation cubicle being configured for regulating the temperature of the at least one first heating lead and of the at least one second heating lead on the at least one first support layer.

* * * * *